(12) United States Patent
Myung et al.

(10) Patent No.: US 11,797,054 B2
(45) Date of Patent: Oct. 24, 2023

(54) FOLDABLE DISPLAY DEVICE

(71) Applicant: LG Display Co., Ltd., Seoul (KR)

(72) Inventors: NohJin Myung, Paju-si (KR); Wansoo Lee, Goyang-si (KR); Youngjoo Park, Busan (KR); Jieun Lee, Busan (KR); Eun Roh, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 37 days.

(21) Appl. No.: 17/534,948

(22) Filed: Nov. 24, 2021

(65) Prior Publication Data

US 2022/0206528 A1 Jun. 30, 2022

(30) Foreign Application Priority Data

Dec. 30, 2020 (KR) ........................ 10-2020-0188485

(51) Int. Cl.
*G06F 1/16* (2006.01)

(52) U.S. Cl.
CPC .......... *G06F 1/1652* (2013.01); *G06F 1/1616* (2013.01); *G06F 1/1618* (2013.01); *G06F 1/1681* (2013.01)

(58) Field of Classification Search
CPC .... G06F 1/1616; G06F 1/1618; G06F 1/1652; G06F 1/1681
See application file for complete search history.

(56) References Cited

U.S. PATENT DOCUMENTS

| 6,223,393 B1* | 5/2001 | Knopf | G06F 1/1681 |
| | | | 16/386 |
| 10,043,421 B2* | 8/2018 | Koo | G09F 9/301 |
| 10,503,210 B2* | 12/2019 | Lee | G06F 1/1681 |
| 10,664,017 B2* | 5/2020 | Kim | H10K 59/40 |
| 10,871,803 B2* | 12/2020 | Wu | E05D 1/00 |
| 2015/0062525 A1* | 3/2015 | Hirakata | H04M 1/0268 |
| | | | 349/158 |
| 2015/0361696 A1 | 12/2015 | Tazbaz | |
| 2018/0059718 A1* | 3/2018 | Ramaswamy | G06F 1/1643 |
| 2019/0250663 A1* | 8/2019 | Park | G06F 1/1681 |

FOREIGN PATENT DOCUMENTS

KR 10-2016-0090471 A 8/2016

* cited by examiner

*Primary Examiner* — Nidhi Thaker
(74) *Attorney, Agent, or Firm* — Birch, Stewart, Kolasch & Birch, LLP

(57) ABSTRACT

A foldable display device includes a display panel which includes a folding area and non-folding areas on some sides of the folding area, and a hinge unit which is disposed in an area corresponding to the folding area below the display panel to in-fold or out-fold the display panel. The hinge unit includes a plurality of rotary shafts and a plurality of coupling links disposed between the plurality of rotary shafts. Accordingly, the foldable display device can be bi-directionally (e.g., inwardly or outwardly) folded by the hinge unit with a simple structure. Further, a radius of curvature during the folding can be desirably changed by adjusting a component of the hinge unit, for example, a number of the plurality of rotary shafts and the plurality of coupling links, a cross-sectional length, and the like.

13 Claims, 9 Drawing Sheets

FOLDABLE DISPLAY DEVICE

CROSS-REFERENCE TO RELATED APPLICATIONS

This application claims priority to Korean Patent Application No. 10-2020-0188485 filed on Dec. 30, 2020, in the Korean Intellectual Property Office, the entire contents of which are hereby expressly incorporated herein by reference into the present application.

BACKGROUND

Field

The present disclosure relates to a foldable display device, and more particularly, to a foldable display device which is folded and unfolded in both directions using a hinge unit with a simple structure.

Description of the Related Art

Recently, as the society enters a full-scale information era, a field of a display device which processes and displays a large number information has been rapidly developed. As display devices which are used for a monitor of a computer, a television, a cellular phone, or the like, there are an organic light emitting display device (OLED) which is a self-emitting device and a liquid crystal display device (LCD) which uses a separate light source.

An applicable range of the display device is diversified to personal digital assistants as well as monitors of computers and televisions and a display device with a large display area and a reduced volume and weight is being studied.

Recently, a flexible display device which is manufactured to be capable of displaying images even though the flexible display device is bent or folded like papers is attracting attention as the next generation display device. The flexible display device utilizes a plastic thin film transistor substrate rather than glass to be classified into an unbreakable display device having a high durability, a bendable display device which can be bent without being broken, a rollable display device which can be rolled, and a foldable display device which can be folded. Such a flexible display device has advantages in terms of space utilization, interior, and designs and has various application fields.

SUMMARY OF THE DISCLOSURE

An object to be achieved by the present disclosure is to provide a foldable display device with a simple structure which is capable of being folded and unfolded in both directions.

Another object to be achieved by the present disclosure is to provide a foldable display device in which various radii of curvature can be set during the folding.

Objects of the present disclosure are not limited to the above-mentioned objects, and other objects, which are not mentioned above, can be clearly understood by those skilled in the art from the following descriptions.

According to an aspect of the present disclosure, a foldable display device includes a display panel which includes a folding area and non-folding areas on sides of the folding area; and a hinge unit which is disposed in an area corresponding to the folding area below the display panel to in-fold or out-fold the display panel. The hinge unit includes a plurality of rotary shafts and a plurality of coupling links disposed between the plurality of rotary shafts. Accordingly, the foldable display device can be bi-directionally (e.g., inwardly or outwardly) folded by the hinge unit with a simple structure. Further, a radius of curvature during the folding can be desirably changed by adjusting the component of the hinge unit, for example, the number of the plurality of rotary shafts and the plurality of coupling links and a cross-sectional length.

Other detailed matters of the exemplary embodiments are included in the detailed description and the drawings.

According to the present disclosure, the foldable display device can implement bidirectional (e.g., inward and outward) folding while simplifying a component of the hinge unit and improving a difficulty of processing the component by applying a hinge unit with a simple structure.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
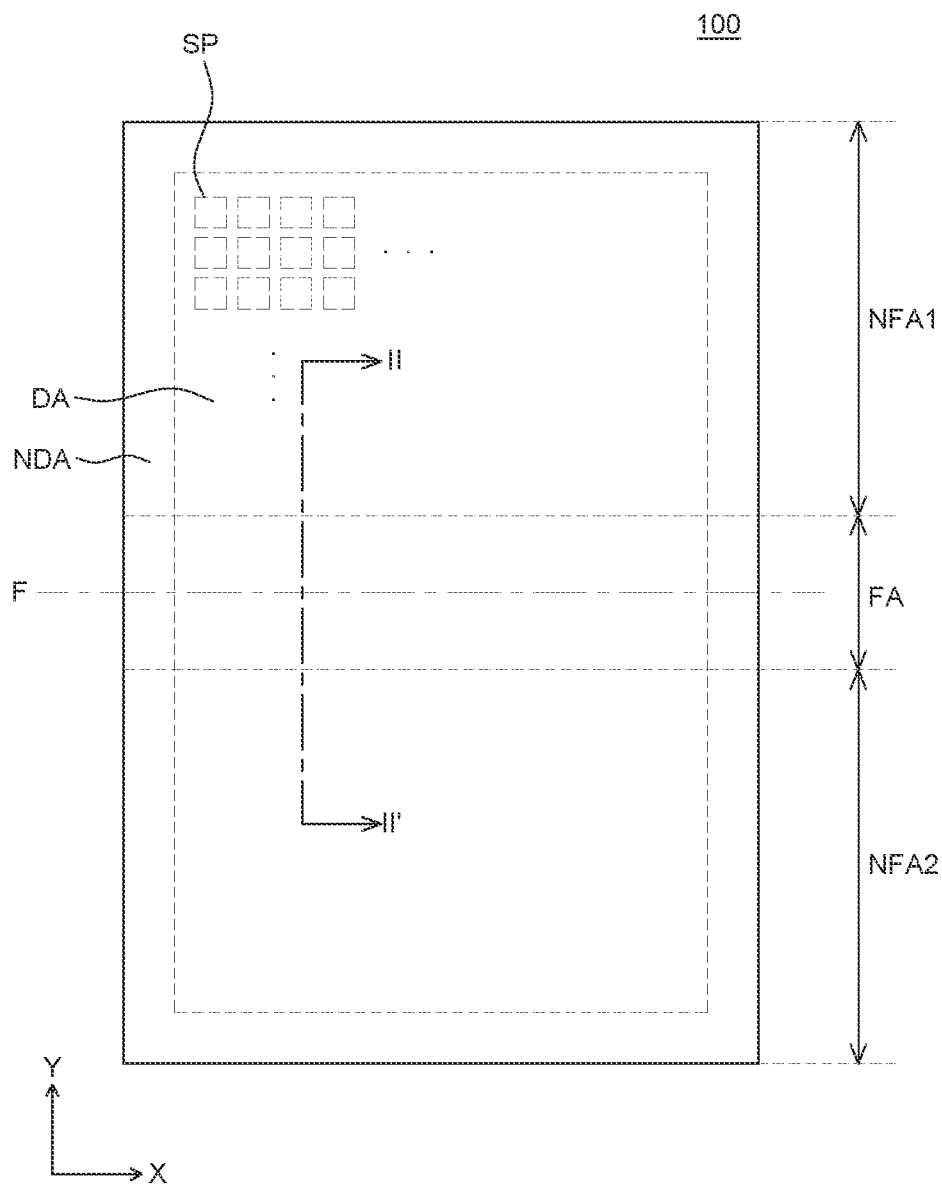
FIG. 1 is a schematic plan view of a foldable display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, the present disclosure will be described in detail with reference to the drawings.

Figure 2:
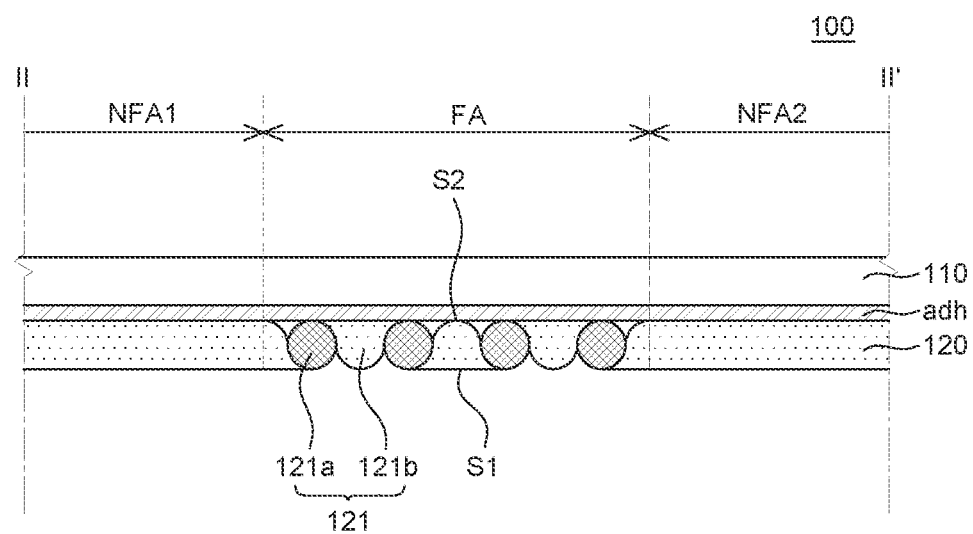
FIG. 2 is a schematic cross-sectional view of the foldable display device taken along the line II-II' of FIG. 1.

FIG. 1 is a schematic plan view of a foldable display device according to an exemplary embodiment of the present disclosure. FIG. 2 is a schematic cross-sectional view of the foldable display device taken along the line II-II' of FIG. 1. Further, all the components of each foldable display device according to all embodiments of the present disclosure are operatively configured and coupled.

Referring to FIGS. 1 and 2, a foldable display device 100 according to the exemplary embodiment of the present disclosure includes a display panel 110 and a back cover 120. Hereinafter, for the convenience of description, the foldable display device according to the exemplary embodiment of the present disclosure is assumed as an organic light emitting display device, but it is not limited thereto.

Referring to FIG. 1, the display panel included in the foldable display device 100 includes a display area DA and a non-display area NDA. Further, the display panel includes a folding area FA and non-folding areas NFA1 and NFA2. The display panel can be divided into the display area DA and the non-display area NDA depending on whether to display images and can be divided into a folding area FA and non-folding areas NFA1 and NFA2 on two or more sides of the folding area FA depending on whether to be foldable.

The display area DA is an area where a plurality of pixels is disposed to substantially display images. In the display area DA, a plurality of pixels which includes an emission area to display images, a thin film transistor for driving the pixels, and a capacitor can be disposed. One pixel can include a plurality of sub pixels SP. The sub pixel SP is a minimum unit which configures the display area and each sub pixel SP can be configured to emit light of a specific wavelength band. For example, each of the sub pixels SP can be configured to emit red light, green light, blue light, or white light.

The non-display area NDA is located to enclose the display area DA. The non-display area NDA is an area where images are not substantially displayed and various wiring lines, driving ICs, printed circuit boards, and the like, for driving the pixels and the driving circuits disposed in the display area DA are disposed therein. For example, in the non-display area NDA, various ICs such as a gate driver IC and a data driver IC, VSS lines, and the like can be disposed.

As described above, the display panel can be defined as a folding area FA and non-folding areas NFA1 and NFA2 depending on whether to be foldable. The display panel according to the exemplary embodiment of the present disclosure includes a first non-folding area NFA1, a folding area FA, and a second non-folding area NFA2 which are sequentially located along a direction perpendicular to a folding axis F of the folding area FA, for example, a Y-axis direction.

The folding area FA is an area which is folded when the foldable display device 100 is folded and can include a part of the display area DA and a part of the non-display area NDA. The folding area FA can be folded along a direction perpendicular to the folding axis F of the folding area FA, for example, along a specific radius of curvature with respect to the Y-axis direction of FIG. 1. When the folding area FA is folded with respect to a direction perpendicular to the folding axis F, the folding area FA can form a part of a circle or an oval. At this time, a radius of curvature of the folding area FA can refer to a radius of a circle or an oval formed by the folding area FA.

The first non-folding area NFA1 and the second non-folding area NFA2 are not folded when the foldable display device 100 is folded. For example, the first non-folding area NFA1 and the second non-folding area NFA2 maintain a flat state when the foldable display device 100 is folded. The first non-folding area NFA1 and the second non-folding area NFA2 can include a part of the display area DA and a part of the non-display area NDA. When the folding area FA is folded with respect to the folding direction, the first non-folding area NFA1 and the second non-folding area NFA2 can overlap each other.

The display panel 110 is a panel in which images are implemented. Display elements for implementing images and circuit units for driving the display elements can be disposed in the display panel. For example, when the foldable display device 100 is an organic light emitting display device, the display element can include an organic light emitting diode.

The circuit units can include various thin film transistors, capacitors, wiring lines, and driving ICs for driving the organic light emitting diode. For example, the circuit units can include various configurations such as a driving thin film transistor, a switching thin film transistor, a storage capacitor, a gate line, a data line, a gate driver IC, and a data driver IC, but are not limited thereto.

In the display panel 110, a flexible substrate on which a driving thin film transistor and a light emitting diode are formed is encapsulated by an encapsulation unit so that in order to implement a flexibility, the display panel 110 includes a flexible substrate having a very thin thickness and a display element disposed on the flexible substrate.

The flexible substrate can be formed of an insulating material having a flexibility, for example, can be an insulating plastic substrate selected from polyimide, polyethersulfone, polyethylene terephthalate, and polycarbonate.

The plastic substrate has a relatively weak barrier characteristic against moisture or oxygen so that in order to compensate therefor, the plastic substrate can have a structure in which a plastic film and an inorganic layer are laminated. For example, the flexible substrate can have a multi-layered structure in which a first plastic film, an inorganic layer, and a second plastic film are sequentially laminated, but is not limited thereto.

A driving thin film transistor for driving the display element can be disposed on the flexible substrate. The driving thin film transistor can be disposed in each of the plurality of pixel areas. For example, the driving thin film transistor includes a gate electrode, an active layer, a source electrode, and a drain electrode. Further, the driving thin film transistor can further include a gate insulating layer which insulates the gate electrode from the active layer and an interlayer insulating layer which insulates the gate electrode from the source electrode and the drain electrode. A planarization layer can be disposed on the driving thin film transistor to planarize an upper surface. The display element can be disposed on the planarization layer. The display element can be an organic light emitting diode. The organic light emitting diode can include an anode, a cathode, and an organic light emitting layer disposed therebetween. In the organic light emitting diode, holes injected from the anode and electrons injected from the cathode are coupled on the organic light emitting layer to emit light. The image can be displayed using the light emitted as described above.

The flexible substrate has an excellent foldability, but has a thin thickness and has a rigidity lower than that of a glass substrate or a metal substrate so that it is difficult to consistently maintain a shape during the folding and thus, a sagging phenomenon can occur.

Therefore, in order to support the display panel 110 including the flexible substrate and protect the display panel 110 from moisture or foreign substances permeating from the outside or external impacts, a back cover 120 is disposed on a rear surface of the display panel 110. For example, the back cover 120 can be attached onto the rear surface of the display panel 110 by means of an adhesive layer adh.

Referring to FIG. 2, the back cover 120 includes a hinge unit 121 which is disposed in an area corresponding to the folding area FA to in-fold or out-fold the display panel 110. In a flat state of the foldable display device 100, the hinge units 121 are disposed to be parallel thereto in one direction to support the display panel 110 from the rear surface. Hereinafter, even though it has been described that the hinge unit 121 is integrally formed with the back cover 120 in the folding area FA of the back cover 120 which supports the display panel 110, the hinge unit 121 can be disposed on the rear surface of the back cover 120 so as to correspond to the folding area FA to fold or unfold the foldable display device 100.

For example, when the hinge unit 121 is integrally formed with the folding area FA of the back cover 120, a rotary shaft 121a which forms an outermost periphery of the hinge unit 121 and the back cover 120 can be linked by the same manner as that of the rotary shaft 121a and a coupling link 121b to be described below. However, it is not limited thereto.

The hinge unit 121 includes a plurality of rotary shafts 121a and a plurality of coupling links 121b. For example, the hinge unit 121 includes n rotary shafts 121a (here, n is a natural number of 2 or larger) and n−1 coupling links 121b disposed between the n rotary shafts 121a.

In the exemplary embodiment of the present disclosure, in the hinge unit 121, the plurality of coupling links 121b is disposed between the plurality of rotary shafts 121a. At this time, the plurality of coupling links 121b each can include a first surface S1 having a flat surface and a second surface S2 having a curved surface, and the second surface S2 has two concave surfaces CC and a convex surface CV between the concave surfaces CC. At this time, a radius of curvature of the concave surface CC can correspond to a radius of curvature of the rotary shaft 121a. For example, the rotary shaft 121a can be disposed to be in contact with the second surface S2 of the coupling link 121b, specifically, the concave surface CC of the second surface S2. Therefore, desirably, a radius of curvature of the concave surface CC can be equal to a radius of curvature of the rotary shaft 121a.

Further, the plurality of coupling links 121b disposed between the plurality of rotary shafts 121a can be sequentially disposed to be vertically symmetrical. For example, among the plurality of coupling links 121b, a first coupling link is disposed such that a first surface S1 faces an upper portion, for example, a display surface of the display panel 110. Further, a second coupling link adjacent to the first coupling link can be disposed such that a first surface S1 faces a lower portion, for example, a rear surface of the display panel 110.

By doing this, in the hinge unit 121 of the present disclosure, the plurality of rotary shafts 121a is fastened with one side and the other side of the plurality of coupling links 121b to be rotatable. For example, the rotary shaft 121a of the hinge unit 121 is rotatably fastened with one side and the other side of the plurality of coupling links 121b to be fastened to be rotatable along a second surface S2 of the coupling link 121b, and specifically, the concave surface CC.

Accordingly, in the display device 100 according to the exemplary embodiment of the present disclosure, the plurality of coupling links 121b is sequentially disposed between the plurality of rotary shafts 121a to be vertically symmetrical. In this case, the rotary shaft 121a is disposed to be in contact with the second surface S2 having a curved surface of the coupling link 121b so that the hinge unit 121 can be bi-directionally foldable.

The plurality of rotary shafts 121a and the plurality of coupling links 121b which configure the hinge unit 121 will be described in more detail below.

In some exemplary embodiment, a back plate can be further provided between the display panel 110 and the back cover 120. The display panel 110 is formed to have a thin thickness, so that in order to further support the display panel, the back plate can be attached onto the rear surface of the display panel 110. Further, when the foldable display device 100 is folded, the back plate maintains the curvature of the display panel 110 to be constant and suppresses the creases generated on the top surface of the display panel 110.

The back plate can be formed of stainless steel (SUS), stainless steel SUS containing metals such as nickel (Ni), or a metal material such as iron (Fe), aluminum (Al), or magnesium (Mg). Desirably, the back plate can be formed of stainless steel SUS. For example, the stainless steel SUS has a high restoring force and rigidity so that even though the thickness of the back plate is reduced, the high rigidity can be maintained. Therefore, the back plate supports the display panel 110 and reduces an overall thickness of the foldable display device 100 to reduce a radius of curvature of the folding area FA. However, the back plate 150 is not limited thereto and can be formed of a polymer such as polymethylmetacrylate (PMMA), polycarbonate (PC), polyvinylalcohol (PVA), acrylonitrile-butadiene-styrene (ABS), polyethylene terephthalate (PET), silicone, or polyurethane (PU).

Further, a cover window can be disposed above the display panel 110. The cover window protects the display panel 110 from the external impact and scratches. Therefore, the cover window can be formed of a material which is transparent and has excellent impact resistance and scratch resistance. Further, the cover window protects the display panel 110 from the moisture, etc. permeating from the outside.

The cover window can be a soft plastic-based cover which is foldable, to ensure the thin thickness and the flexibility of the foldable display device 100. For example, the cover window can be a film formed of a polymer, such as polyimide, polyamide imide, polyethylene terephthalate, polymethyl methacrylate, polypropylene glycol, and polycarbonate. As another example, the cover window can be a film formed of a photoisotropic polymer such as cycloolefin (co)polymer, photoisotropic polycarbonate, or photoisotropic polymethyl methacrylate.

Further, various functional layers can be laminated on the cover window. For example, various functional layers such as an external reflection reducing layer, a UV blocking layer, or a hard coating layer can be disposed on the cover window, but is not limited thereto.

Hereinafter, a plurality of rotary shafts and a plurality of coupling links which configure the hinge unit will be described in detail with reference to FIGS. 3 to 5.

Figure 3:
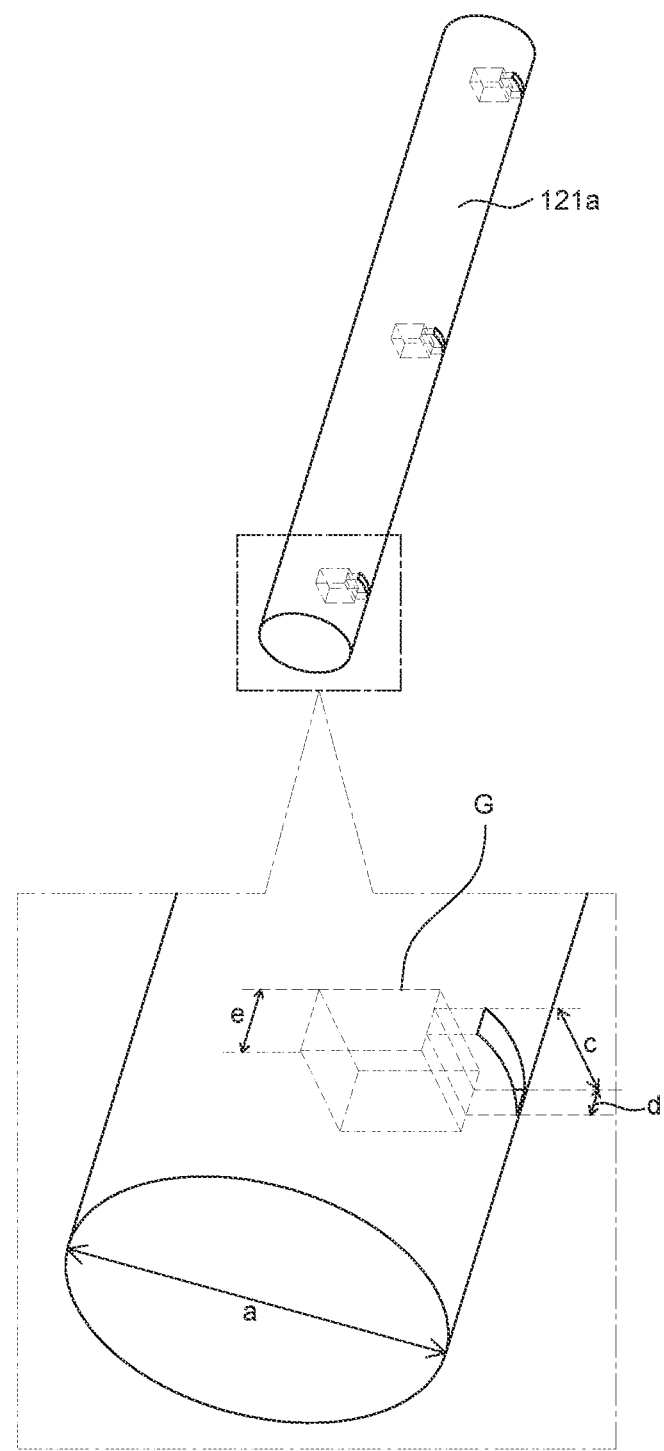
FIG. 3 is a schematic three-dimensional diagram illustrating an example of a rotary shaft according to an exemplary embodiment of the present disclosure.

FIG. 3 is a schematic three-dimensional diagram illustrating a rotary shaft according to an exemplary embodiment of the present disclosure. FIG. 4 is a schematic three-dimensional diagram illustrating a coupling link according to an exemplary embodiment of the present disclosure. FIG. 5 is a schematic three-dimensional diagram illustrating a fastening unit of a rotary shaft and a coupling link according to an exemplary embodiment of the present disclosure.

Figure 4:
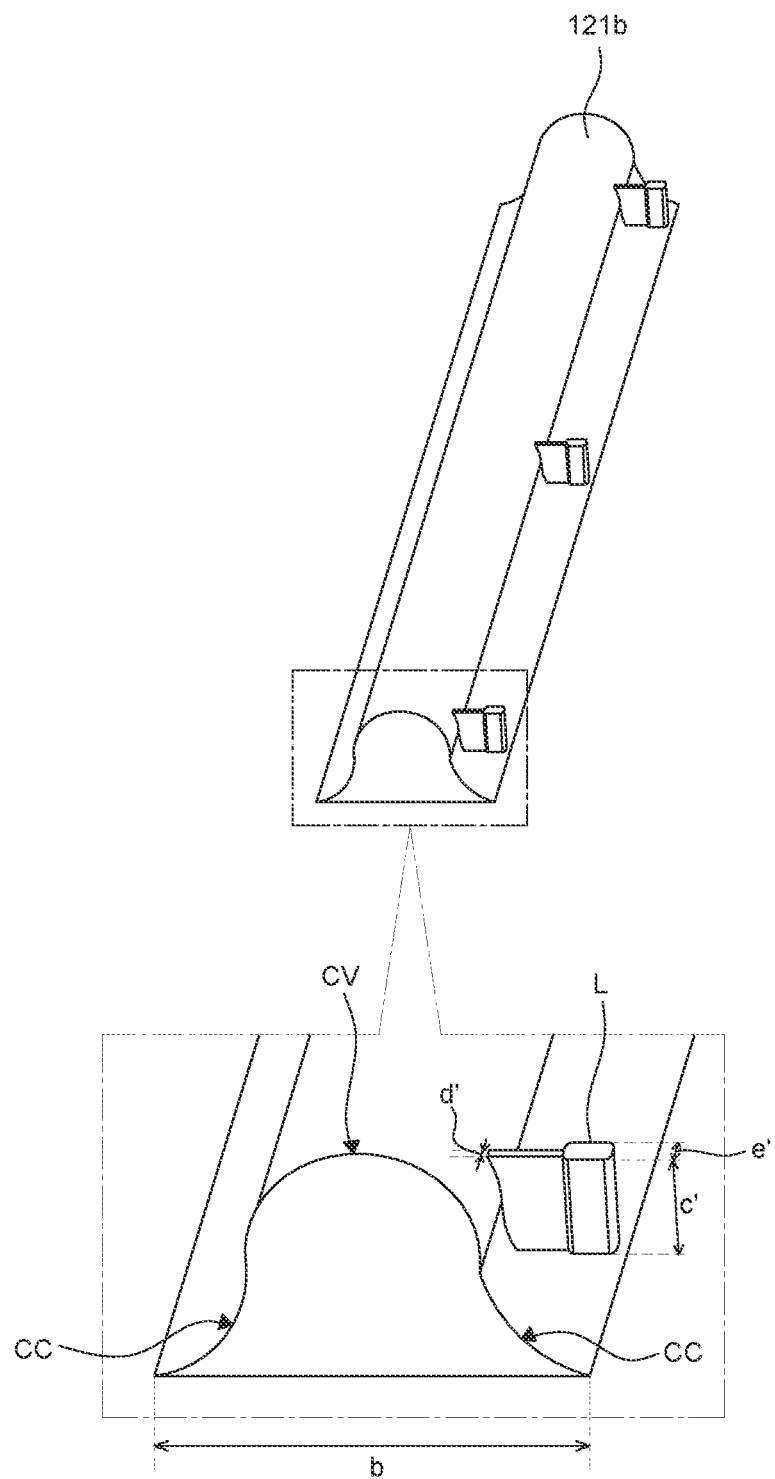
FIG. 4 is a schematic three-dimensional diagram illustrating an example of a coupling link according to an exemplary embodiment of the present disclosure.
Figure 5:
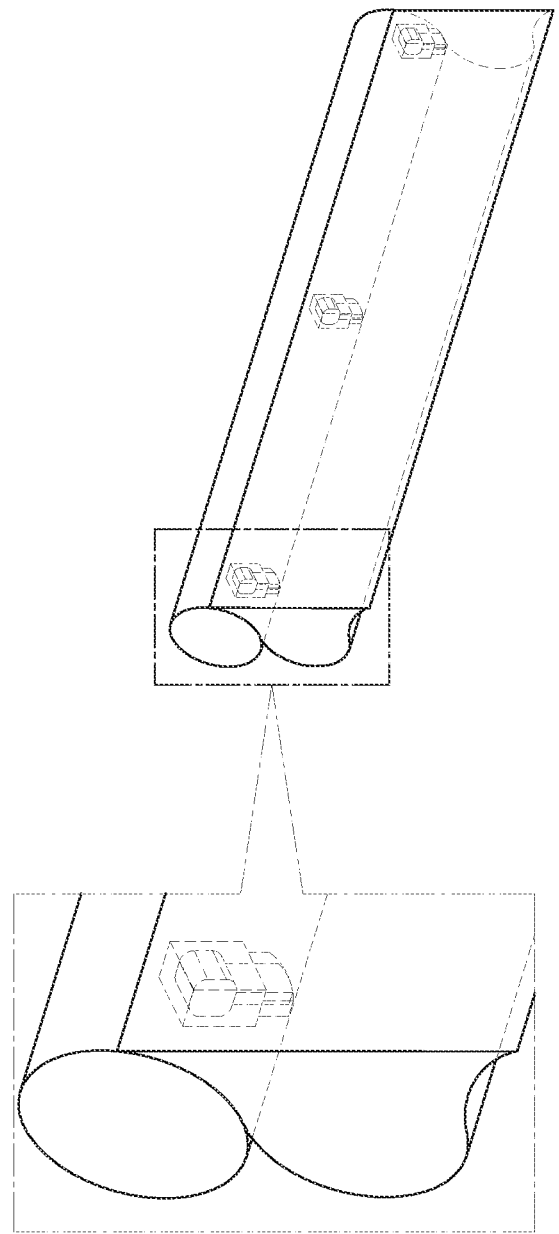
FIG. 5 is a schematic three-dimensional diagram illustrating an example of a fastening unit of a rotary shaft and a coupling link according to an exemplary embodiment of the present disclosure.

Referring to FIGS. 3 to 5, according to the exemplary embodiment of the present disclosure, the plurality of rotary shafts 121a and the plurality of coupling links 121b are linked to form the hinge unit 121. Hereinafter, in order to mainly describe a link of the rotary shaft 121a and the coupling links 121, it is illustrated that one rotary shaft 121a is linked to one coupling link 121b so that one rotary shaft 121a includes a plurality of fastening grooves G at one side and one coupling link 121b includes a plurality of fastening units L at one side. However, one rotary shaft 121a can include a plurality of fastening grooves G at one side and the other side and one coupling link 121b includes a plurality of fastening units L at one side and the other side so that the plurality of rotary shafts 121a and the plurality of coupling links 121b can be linked.

According to the exemplary embodiment of the present disclosure, the plurality of fastening units L included in the coupling link 121b is linked to the plurality of fastening grooves G included in the rotary shaft 121a to form the hinge unit 121.

Referring to FIG. 3, the rotary shaft 121a which is one component of the hinge unit 121 includes a plurality of fastening grooves G. The fastening groove G is a part to which a coupling link 121b which is the other component which configures the hinge unit 121 is linked so that the fastening groove can form a predetermined space inwardly from a surface of the rotary shaft 121a.

For example, the plurality of fastening grooves G can be disposed on a surface of the rotary shaft 121a with a center of curvature which is the same as a center of the curvature of the rotary shaft 121a. For example, the plurality of fastening grooves G can be disposed with a constant interval, but is not limited thereto.

Specifically, each of the plurality of fastening grooves G includes an insertion portion on the surface of the rotary shaft 121a and a coupling portion which is formed in the rotary shaft 121a inwardly from the insertion portion. At this time, a width e of the coupling portion of the plurality of fastening grooves G can be larger than a width d of the insertion portion.

For example, the coupling link 121b is linked to the plurality of fastening grooves G and then the coupling link 121b should not be deviated from the fastening groove G during the process of folding or unfolding the display device 100. Therefore, in the plurality of fastening grooves G, the insertion portion has a relatively small width d and the coupling portion has a large width e.

Referring to FIG. 4, the coupling link 121b which is the other component of the hinge unit 121 includes a plurality of fastening units L which is linked to the plurality of fastening grooves G.

Specifically, the plurality of fastening units L included in the coupling link 121 is linked to the plurality of fastening grooves G included in the rotary shaft 121a. At this time, since the fastening unit L should not be deviated from the fastening groove G, a portion of the plurality of fastening units L included in the coupling link 121b which is coupled to the fastening groove G needs to have a width which is larger than a width d of the insertion portion of the fastening groove G and can be equal to or smaller than a width e of the coupling portion. For example, the plurality of fastening units L included in the coupling link 121b includes a body portion which protrudes from the coupling link 121b and has a first width d' and a head portion which has a second width e' larger than the first width d'. At this time, the body portion of the fastening unit L corresponds to the insertion portion of the fastening groove G and the head portion can be linked to the coupling portion of the fastening groove G.

At this time, the plurality of fastening unit L can be formed of a material having an elasticity. For example, the plurality of fastening units L can include a material which is compressed when a predetermined force is applied thereto from the outside and then uncompressed when the force applied from the outside is removed. For example, the plurality of fastening units L can include a resin having an elasticity and a polymer material which is self-restorable, but is not limited thereto.

Accordingly, when the head portions of the plurality of fastening units L are inserted into the plurality of fastening grooves G, a predetermined force from the outside can be applied to compress the head portion so as to pass through the width d of the insertion portion when the head portion passes through the insertion portion. And then, when the head portion passes through the insertion portion of the surface of the rotary shaft 121a, the force applied from the outside is removed so that the head portion returns to its original width e' due to the elasticity to be seated in the coupling portion of the rotary shaft 121a.

Further, referring to FIGS. 3 to 5 together, a length c of the insertion portion of the rotary shaft 121a can be longer than a length c' of the body portion of the coupling link 121b.

Specifically, the rotary shaft 121a and the coupling link 121b are rotatably fastened. In this case, in order to rotate the hinge unit 121 with a predetermined radius of curvature with respect to the rotary shaft 121a without causing the deviation of the coupling link 121b from the rotary shaft 121a, a rotatable space needs to be formed between the rotary shaft 121a and the coupling link 121b. For example, the head portion of the coupling link 121b is linked to the coupling portion of the rotary shaft 121a to be fixed and the body portion of the coupling link 121b is disposed in the insertion portion of the rotary shaft 121a. At this time, the hinge unit 121 can rotate around the rotary shaft 121a in a space corresponding to a difference between the length c of the insertion portion of the rotary shaft 121a and a length of the body portion of the coupling link 121b. Therefore, the length c of the insertion portion of the rotary shaft 121a needs to be longer than a length c' of the body portion of the coupling link 121b.

For example, the radius of curvature of the hinge unit 121 can be set by a cross-sectional length a of the rotary shaft 121a, a cross-sectional length b of the first surface S1 which is a flat surface of the coupling link 121b, and a length c of the insertion portion of the rotary shaft 121a. For example, the maximum radius of curvature with which the hinge unit 121 is rotatable can be selected by adjusting the cross-sectional length a of the rotary shaft 121a and the cross-sectional length b of the first surface S1 of the coupling link 121b.

For example, the maximum radius of curvature with which the hinge unit 121 is rotatable can be the same as the radius of curvature of the first rotary shaft 121a, but is not limited thereto.

Further, when the radius of curvature of the hinge unit 121 is set by adjusting the cross-sectional length a of the rotary shaft 121a and the cross-sectional length b of the first surface S1 of the coupling link 121b, the length c of the insertion portion of the rotary shaft 121a can also be selected to be appropriate for the predetermined maximum radius of curvature.

Therefore, according to the exemplary embodiment of the present disclosure, the foldable display device 100 includes a plurality of rotary shafts 121a and a plurality of coupling links 121b with a simple structure to not only easily select a desired radius of curvature, but also save the cost of the manufacturing process.

Figure 6:
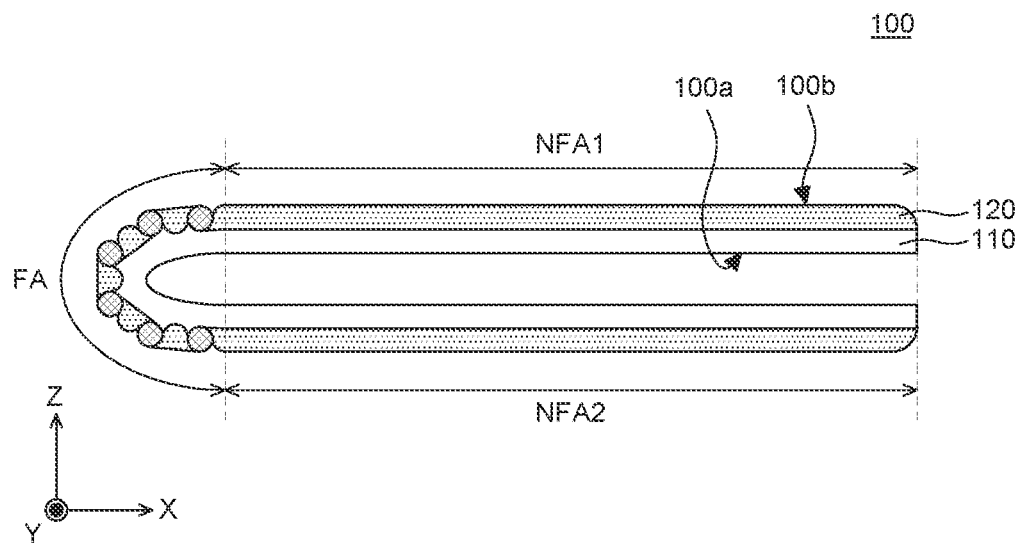
FIG. 6 is a schematic side view illustrating an in-folded shape of a foldable display device according to an exemplary embodiment of the present disclosure.
Figure 7:
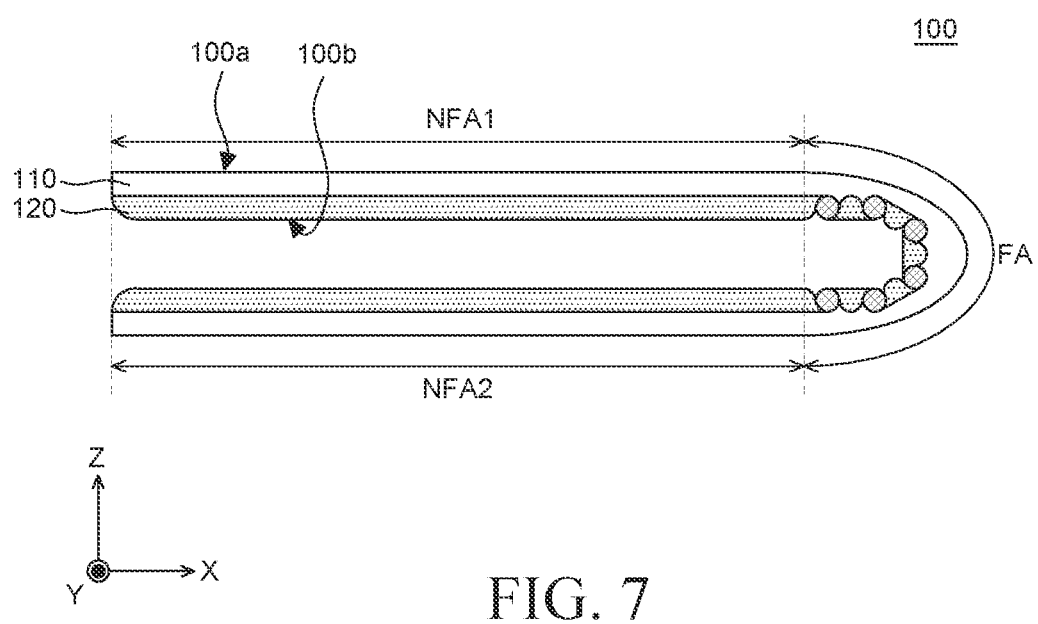
FIG. 7 is a schematic side view illustrating an out-folded shape of a foldable display device according to an exemplary embodiment of the present disclosure.

FIG. 6 is a schematic side view illustrating an in-folded shape of a foldable display device according to an exemplary embodiment of the present disclosure. FIG. 7 is a schematic side view illustrating an out-folded shape of a foldable display device according to an exemplary embodiment of the present disclosure.

For example, a top surface of the foldable display device 100 on which the image is displayed is defined as a display surface 100a and a bottom surface 100b of the foldable display device 100 which is an opposite surface of the display surface 100a is defined as a rear surface 100b. In this case, in the foldable display device 100, the folding areas FA can be in-folded so that the display surfaces 100a face each other as illustrated in FIG. 6 and can also be out-folded so that the display surfaces 100a of the display panel are exposed to the outside as illustrated in FIG. 7.

As described above, in the foldable display device 100 according to the exemplary embodiment of the present disclosure, the plurality of rotary shafts 121a and the plurality of coupling links 121b are sequentially disposed vertically. In this case, the rotary shaft 121a is disposed to be in contact with the second surface S2 which is a curved surface of the coupling link 121b so that the hinge unit 121 can be bi-directionally foldable and unfoldable.

Figure 8:
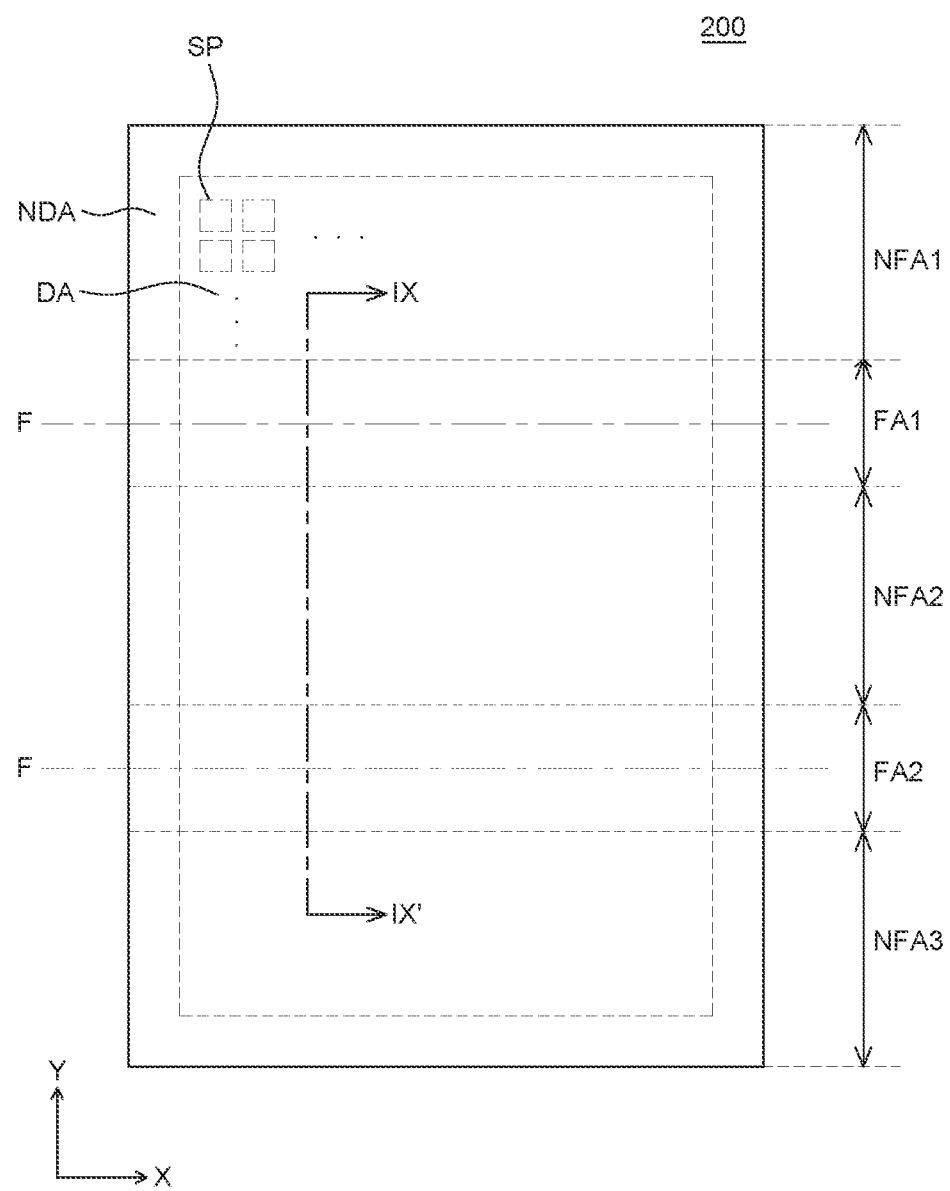
FIG. 8 is a schematic plan view of a foldable display device according to another exemplary embodiment of the present disclosure.
Figure 9:
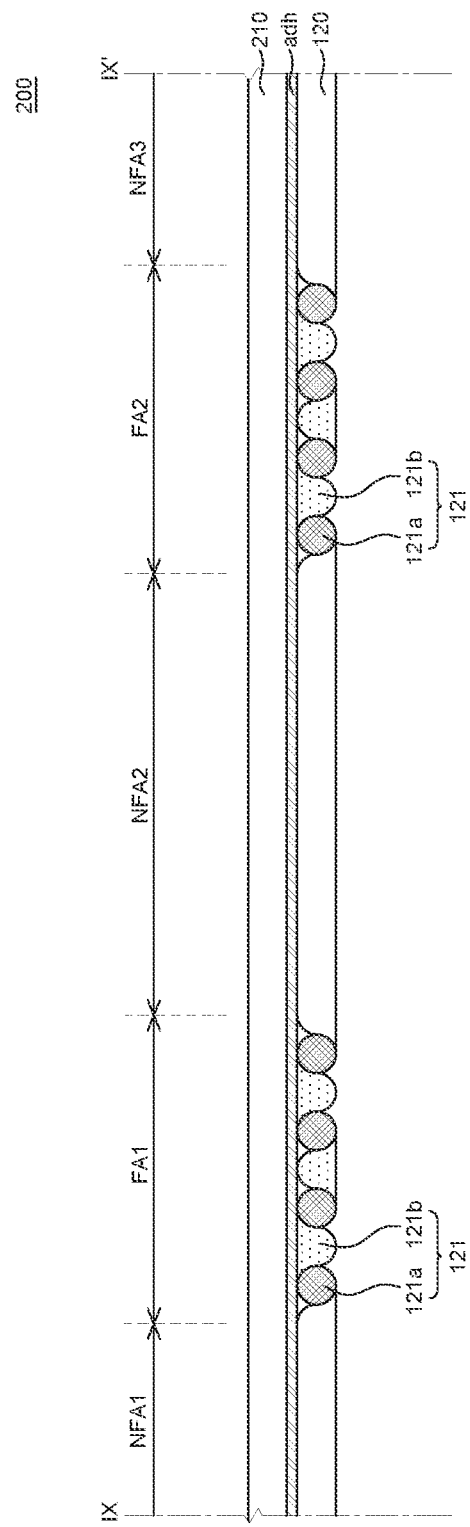
FIG. 9 is a schematic cross-sectional view of the foldable display device taken along the line IX-IX' of FIG. 8.
Figure 10:
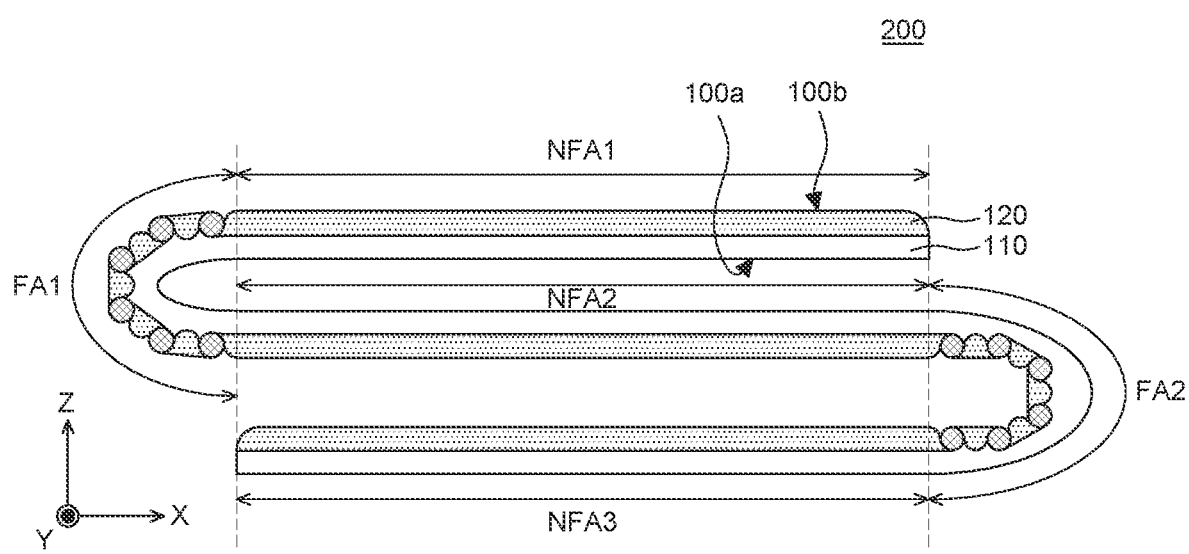
FIG. 10 is a schematic side view illustrating a folded shape of a foldable display device according to another exemplary embodiment of the present disclosure.

FIG. 8 is a schematic plan view of a foldable display device according to another exemplary embodiment of the present disclosure. FIG. 9 is a schematic cross-sectional view of a foldable display device taken along the line IX-IX' of FIG. 8. FIG. 10 is a schematic side view illustrating a folded shape of a foldable display device according to another exemplary embodiment of the present disclosure.

A display panel 210 included in a foldable display device 200 according to another exemplary embodiment of the present disclosure includes a first non-folding area NFA1, a first folding area FA1, a second non-folding area NFA2, a second folding area FA2, and a third non-folding area NFA3 which are sequentially located along a direction perpendicular to a folding axis F. The first folding area FA1 and the second folding area FA2 are areas folded when the foldable display device 200 is folded and include a part of the display area DA and a part of the non-display area NDA. The foldable display device 200 of FIGS. 8 and 9 is substantially the same as the foldable display device of FIGS. 1 and 2 except that the folding areas FA1 and FA2 are further provided, so that a redundant description will be omitted or may be briefly provided.

Referring to FIGS. 8 and 9, the foldable display device 200 according to another exemplary embodiment of the present disclosure includes a display panel 210 in which a plurality of folding areas FA1 and FA2 are defined and a back cover 120.

The first folding area FA1 and the second folding area FA2 are areas folded when the foldable display device 200 is folded so that the first folding area FA1 and the second folding area FA2 can be folded along a specific radius of curvature with respect to a direction perpendicular to the folding axis F, for example, a y-axis direction. When the first folding area FA1 and the second folding area FA2 are folded with respect to the folding axis F, the first folding area FA1 and the second folding area FA2 can form a part of a circle or an oval. At this time, radii of curvature of each of the first folding area FA1 and the second folding area FA2 refer to a radius of a circle or an oval formed by the first folding area FA1 and the second folding area FA2, respectively.

The first non-folding area NFA1, the second non-folding area NFA2, and the third non-folding area NFA3 are not folded when the foldable display device 200 is folded. For example, the first non-folding area NFA1, the second non-folding area NFA2, and the third non-folding area NFA3 maintain a flat state when the foldable display device 200 is folded. When the first folding area FA1 and the second folding area FA2 are folded with respect to the folding axis F, the first non-folding area NFA1, the second non-folding area NFA2, and the third non-folding area NFA3 overlap each other. A top surface of the foldable display device 200 on which the image is displayed is defined as a display surface 100a and a bottom surface of the foldable display device 200 which is an opposite surface of the display surface 100a is defined as a rear surface 100b. In this case, the first folding area FA1 can be in-folded such that the display surfaces 100a of the display panel 210 face each other and the second folding area FA2 can be out-folded such that the display surfaces 100a of the display panel 210 are exposed to the outside.

Referring to FIG. 10, the first folding area FA1 is in-folded such that the display surfaces 100a face inwardly so that the display surface 100a of the first non-folding area NFA1 and the display surface 100a of the second non-folding area NFA2 are disposed to be opposite to each other. Further, the second folding area FA2 is out-folded such that the display surface 100a faces outwardly so that the rear surface 100b of the third non-folding area NFA3 and the rear surface 100b of the second non-folding area NFA2 are disposed to be opposite each other. As illustrated in FIG. 10, when the first folding area FA1 and the second folding area FA2 are folded, other components including a battery can be disposed between the rear surface 100b of the third non-folding area NFA3 and the rear surface 100b of the second non-folding area NFA2, but is not limited thereto.

The foldable display device 200 according to another exemplary embodiment of the present disclosure includes more folding areas FA so that when the foldable display device is not used, it can occupy a less space and then when the foldable display device 200 is used, the foldable display device is unfolded to easily increase the size. Therefore, storage and usage are easily implemented.

The exemplary embodiments of the present disclosure can also be described as follows:

According to an aspect of the present disclosure, a foldable display device including a display panel which includes a folding area and non-folding areas on sides of the folding area; and a hinge unit which is disposed in an area corresponding to the folding area below the display panel to in-fold or out-fold the display panel, wherein the hinge unit includes a plurality of rotary shafts and a plurality of coupling links disposed between the plurality of rotary shafts.

The plurality of coupling links has a first surface with a flat surface and a second surface with a curved surface, and the rotary shaft can be disposed to be in contact with the curved surface.

The second surface includes two concave surfaces and a convex surface between the concave surfaces and a radius of curvature of the concave surface can correspond to a radius of curvature of the rotary shaft.

The plurality of coupling links can be sequentially disposed to be vertically symmetrical.

A first coupling link among the plurality of coupling links is disposed such that the first surface faces up and a second coupling link adjacent to the first coupling link can be disposed such that the first surface faces down.

The rotary shaft includes a plurality of fastening grooves, and the coupling link can include a plurality of fastening units linked to the plurality of fastening grooves.

The plurality of fastening grooves has a center of curvature which is the same as a center of curvature of the rotary shaft, the plurality of fastening grooves includes an insertion portion on the surface of the rotary shaft and a coupling portion formed inwardly from the insertion portion, and a width of the coupling portion can be larger than a width of the insertion portion.

The plurality of fastening units can include a body portion having a first width and a head portion having a second width which is larger than the first width.

A length of the insertion portion of the rotary shaft can be longer than a length of the body portion of the coupling link.

A width of the insertion portion of the rotary shaft can be smaller than a width of the head portion of the coupling link.

The plurality of fastening units can include an elastic body.

The display panel can include a first non-folding area, a first folding area, a second non-folding area, a second folding area, and a third non-folding area which are sequentially located along a direction perpendicular to a folding axis.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto.

Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A foldable display device, comprising:
   a display panel including a folding area and non-folding areas on sides of the folding area; and
   a hinge unit disposed in an area corresponding to the folding area below the display panel to in-fold or out-fold the display panel,
   wherein the hinge unit includes a plurality of rotary shafts and a plurality of coupling links disposed between the plurality of rotary shafts,
   wherein each of the plurality of coupling links has a first surface with a flat surface and a second surface with a curved surface,
   wherein in each of the plurality of coupling links, the second surface includes two concave surfaces and a convex surface between the two concave surfaces, and
   wherein each of the plurality of rotary shafts are disposed to be in contact with one of the concave surfaces of the second surface of a respective one of the plurality of coupling links.

2. The foldable display device according to claim 1, wherein a radius of curvature of at least one of the two concave surfaces corresponds to a radius of curvature of a corresponding rotary shaft among the plurality of rotary shafts.

3. The foldable display device according to claim 1, wherein the plurality of coupling links is sequentially disposed to be vertically symmetrical.

4. The foldable display device according to claim 1, wherein a first coupling link among the plurality of coupling links is disposed so that the first surface of the first coupling link faces up while a second coupling link adjacent to the first coupling link is disposed so that the first surface of the second coupling link faces down.

5. A foldable display device, comprising:
   a display panel including a folding area and non-folding areas on sides of the folding area; and
   a hinge unit disposed in an area corresponding to the folding area below the display panel to in-fold or out-fold the display panel,
   wherein the hinge unit includes a plurality of rotary shafts and a plurality of coupling links disposed between the plurality of rotary shafts, wherein one of the plurality of rotary shafts includes a plurality of fastening grooves, and wherein a corresponding coupling link among the plurality of coupling links includes a plurality of fastening units linked to the plurality of fastening grooves.

6. The foldable display device according to claim 5, wherein the plurality of fastening grooves has a center of curvature which is the same as a center of curvature of the rotary shaft, the plurality of fastening grooves includes an insertion portion on a surface of the rotary shaft and a coupling portion disposed inwardly from the insertion portion, and a width of the coupling portion is larger than a width of the insertion portion.

7. The foldable display device according to claim 5, wherein the plurality of fastening units includes:

a body portion having a first width, and a head portion having a second width which is larger than the first width.

8. The foldable display device according to claim 7, wherein a length of the insertion portion of the rotary shaft is longer than a length of the body portion of the coupling link.

9. The foldable display device according to claim 7, wherein a width of the insertion portion of the rotary shaft is smaller than a width of the head portion of the coupling link.

10. The foldable display device according to claim 6, wherein a length of the insertion portion of the rotary shaft is longer than a length of the body portion of the coupling link.

11. The foldable display device according to claim 6, wherein a width of the insertion portion of the rotary shaft is smaller than a width of the head portion of the coupling link.

12. The foldable display device according to claim 5, wherein the plurality of fastening units includes an elastic body.

13. The foldable display device according to claim 5, wherein the display panel includes a first non-folding area, a first folding area, a second non-folding area, a second folding area, and a third non-folding area, which are sequentially disposed along a direction perpendicular to a folding axis of the folding area.

* * * * *